UNITED STATES PATENT OFFICE.

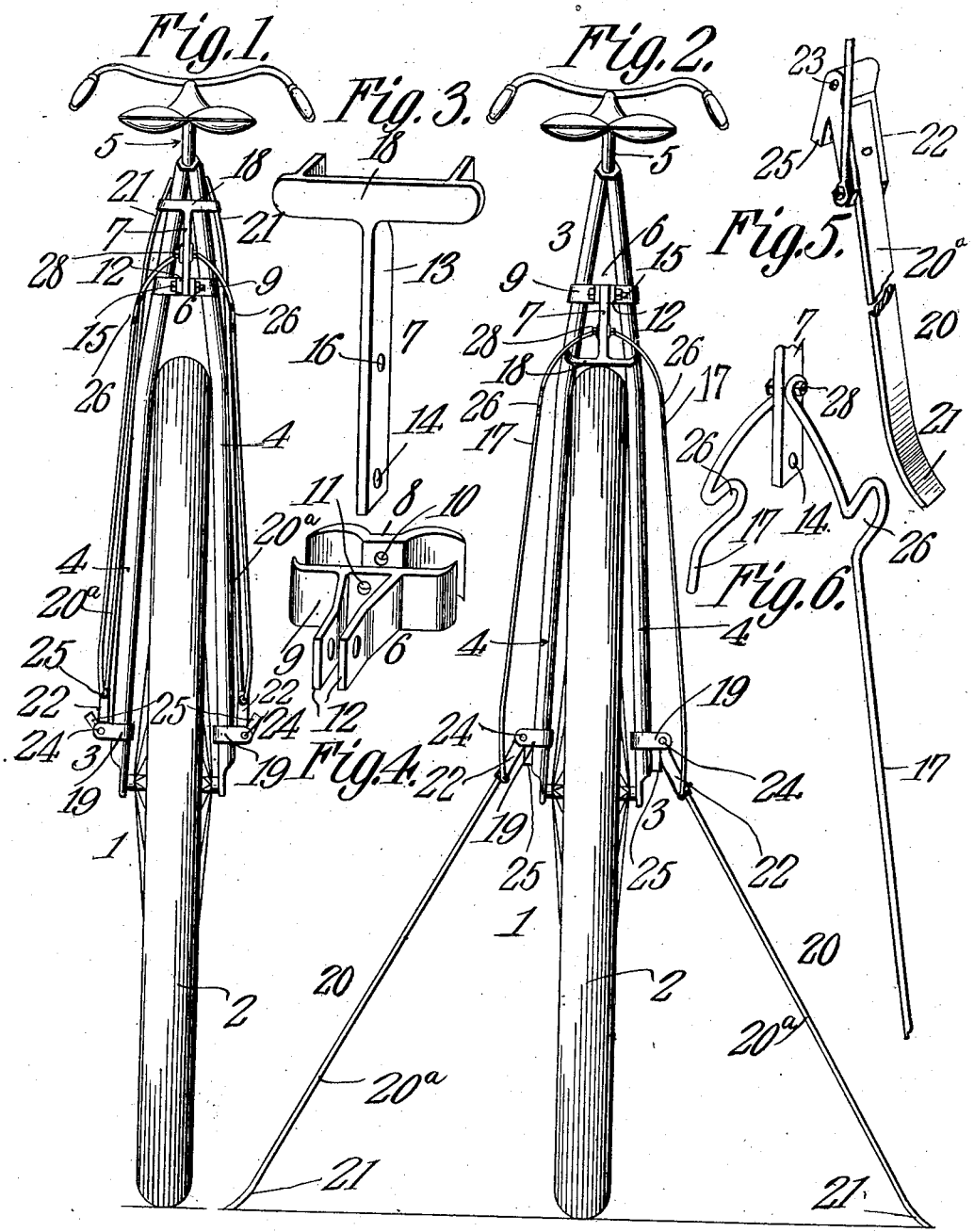

JESSE C. SCOGGINS, OF WICHITA, KANSAS.

BICYCLE-SUPPORT.

No. 891,445.          Specification of Letters Patent.          Patented June 23, 1908.

Application filed September 16, 1907. Serial No. 393,153.

*To all whom it may concern:*

Be it known that I, JESSE C. SCOGGINS, a citizen of the United States, residing at Wichita, in the county of Sedgwick and State of Kansas, have invented a new and useful Bicycle-Support, of which the following is a specification.

This invention relates to a support for holding a bicycle in upright position after the rider has descended therefrom and temporarily left it on a road or street.

The object of the invention is to provide a cheap, simple and rigid support for bicycles that will hold it in upright position while the rider ascends or descends from the saddle, and one that can be easily and quickly folded and unfolded at the rider's pleasure. With this and other objects in view, the invention comprises certain novel construction, combination and arrangement of parts hereinafter described and definitely claimed.

In the accompanying drawing: Figure 1 is a rear view of a bicycle provided with the support in folded position. Fig. 2 is a similar view of the bicycle with the support unfolded and sustaining the bicycle in erect position. Fig. 3 is a perspective view of the operating lever. Fig. 4 is a similar view of the clamp bearing for the operating lever. Fig. 5 is a perspective view of one of the supporting rods, a portion of the center being broken away and the ends brought closer together. Fig. 6 is a similar view of one of the connecting links between the operating lever and the supporting rods.

Similar numerals of reference are used for the same parts on all the figures.

A bicycle 1 of the type used at the present time is shown in the drawing with a rear wheel 2 and rear frame 3 straddling the wheel and carrying the bearings thereof in the usual manner. A part of the rear frame 3 comprises two tubular frame rods 4, one on each side of the wheel, extending upwardly and at a forward angle, and, converging towards each other, they are joined some distance above the wheel to another tubular part of the frame (not shown) into which the saddle post 5 has a sliding fit.
A short distance above the wheel 2 a clamp 6 is rigidly attached to the two frame rods 4 to which clamp the operating lever 7 is pivoted. The clamp 6 is made of two plates 8 and 9. The forward clamp plate 8 has a flat central part with curved ends which, when in place, partly surround the frame rods 4. Perforations 10 are made in the flat central part for fastening screws. The rear clamp plate 9 is flat throughout its length with a curved flange on each end to embrace the frame rods 4 on the rear. In the center of the rear clamp plate 9 are threaded perforations 11 for the fastening screws which secure the clamp plates 8 and 9 to the frame.

Projecting rearwardly from the clamp plate 9 are two arms 12, equally spaced on opposite sides of the central line of the rear plate, between which arms the T-shaped operating lever 7 is pivoted. The stem 13 of the operating lever 7 is pierced by two holes, the lower one 14 for the pivot bolt 15 of said operating lever 7, and the upper one 16 to receive the pivot of links 17. The cross arm 18 of the operative lever 7 has its ends bent or curved forwardly to extend around the frame rods 4 when the support is folded, as in Fig. 1, or anterior projections may be formed on said cross arm as in Fig. 3 and spaced to pass either on the outside or inside of said frame rods.

Slidable on the lower end of each frame rod 4 is a clamp bearing 19 which encircles the frame rod and has its ends projecting outwardly parallel to each other and spaced apart to receive a pivoted supporting leg 20. Each end of the clamp bearings has a horizontal hole for the pivot bolts of said supporting legs.

Each supporting leg 20 is preferably made in two parts, a straight ground or lower portion 20ª with outwardly turned feet 21, formed of flat or round metal, or material of other shape, and an upper portion or block 22, riveted or otherwise rigidly fastened to the lower part 20ª. Through the upper end of the block 22 is a hole 23 for a pivot pin 24 which connects the supporting leg with the clamp bearing 19. If desired each clamp bearing may be rigidly fastened to the frame of the bicycle by rivets, bolts, or by brazing. Extending downwardly from the under side of each block 22, when the legs are on the ground, is a finger 25 which bears against the frame of the bicycle and limits the inward movement of the supporting leg so that it cannot be brought too close to the wheel. Were this not provided, the position of the leg would be undetermined and at times it might be brought so near the wheel that it would not afford sufficient support for the bicycle but would buckle or bend and permit the bicycle to fall. It will be understood that this description refers to the support on each side of the wheel although but one has been mentioned.

The links 17 hereinabove mentioned each comprise a rod pivoted by means of a bolt to the block 22 and extending thence upwardly with a slight inclination towards the bicycle frame to a point near the top of the wheel where the links are bent forwardly to form in each a loop 26 which serves as a spring and stay. From the loops 26, the links 17 curve inwardly and are attached to the operating lever 7 by the bolt 28, an eye being formed on each link to permit the bolt to be hinged thereon.

A supporter such as described when applied to a bicycle lies close to the frame of the latter and when folded does not detract from its appearance.

The parts may be made of flat, round, oval or other shaped metal in cross section as is deemed most fit.

Assume now that the bicycle is being upheld by the support and it is desired to close the latter. The operating lever 7 is grasped by the hand and swung on its pivot 15 from the position shown in Fig. 2 to that shown in Fig. 1, the movement raising the links 17 and the legs 20, folding the latter close against the frame before the links are in closed position. It is to be remembered that the latter part of the movement of the operating lever 7 is such as to cause the pivot 28 of the links 17 to move in an approximately horizontal direction. As heretofore stated, the legs 20 are closed before the operating lever has reached the end of its movement, thus enabling the loops 26 on the links 17 to pass outside of the folded legs and hold them close against the frame to prevent rattling when the support is completely folded. When it is desired to support the bicycle, the operating lever 7 is turned downwardly on its pivot carrying the links 17 with it, and the latter through their connection with the legs swing them outwardly and downwardly until they rest on the ground, at which time the fingers 25 will bear against the bicycle frame and prevent further movement. The first action of the operating lever is to disengage the loops 26 from the legs so that the latter may fall or swing downwardly.

Having thus described the invention, what is claimed is:—

1. A bicycle support comprising legs pivoted to the rear frame of a bicycle and adapted to swing on pivots in a plane transverse thereto, an operating lever pivoted on the frame below the saddle, and connecting links pivoted to said legs and the operating lever, each of said links having an integral forwardly projecting loop between its ends.

2. A bicycle support comprising legs pivoted to the rear frame of a bicycle and adapted to swing in a plane transverse thereto, an operating lever pivoted on the frame below the saddle, and connecting links between said legs and the lever, said links having each a forwardly projecting spring loop therein to form a spring for retaining the legs when elevated and a stay for locking said elevated legs.

3. A bicycle support comprising legs pivoted to the rear frame of a bicycle and adapted to swing in a plane transverse thereto, an operating lever for swinging said legs pivoted on the frame and arranged to move in a plane at a right angle to the plane of movement of said legs, and connecting links between said legs and the lever, said links having each a forwardly projecting loop so disposed as to be carried across said legs by the same movement of the lever that swings the legs.

4. A bicycle support comprising leg members each member having a block rigidly attached to its upper end provided with a downwardly extending stop, a clamp bearing on each side of the rear frame of the bicycle, said leg members being pivotally connected through the blocks to the clamp bearings and adapted to swing in a plane transverse said rear frame, an operating lever, and a link pivoted on each of said blocks and to said lever, said links having each a forwardly projecting loop so disposed thereon as to make said links longitudinally resilient and to form a stay for the folded legs.

5. A bicycle support comprising legs pivoted to the rear frame of a bicycle and adapted to swing in a plane transverse thereto, an operating lever for swinging said legs pivoted at one end on the frame and movable in a plane at a right angle to the plane of movement of said legs, and connecting links pivoted to said legs and to the lever intermediate its ends and having each a forwardly projecting loop, whereby on rotating the operating lever upwardly, the legs are folded on the frame through the medium of the connecting links and the latter placed under longitudinal tension and as the upward travel of the lever changes to a horizontal one the loops are moved across said folded legs, and the pivotal connections of the links with said lever are carried across the center of rotation of said lever and the support locked in closed position.

6. A bicycle support comprising legs pivoted to the rear frame of a bicycle, an operating lever, links pivoted to said legs and to said lever, and a clamp to which said operating lever is pivoted formed of two plates on opposite sides of said frame and fastened together in the center of said plate.

In testimony that I claim the foregoing as my own, I have hereto affixed my signature in the presence of two witnesses.

JESSE C. SCOGGINS.

Witnesses:
J. B. FISHBACK,
R. F. RALLS.